United States Patent
Zhang et al.

(10) Patent No.: US 12,474,320 B2
(45) Date of Patent: Nov. 18, 2025

(54) METHOD FOR CALCULATING THE OPTIMUM DOSAGE OF THE TWO-COMPONENT SYNCHRONOUS REJUVENATOR FOR AGED SBS-MODIFIED ASPHALT

(71) Applicants: Huazhong University of Science and Technology, Hubei (CN); Hubei Changjiang Road and Bridge Co., Ltd., Hubei (CN); Hubei Communications Construction Testing Co., Ltd., Hubei (CN)

(72) Inventors: Derun Zhang, Hubei (CN); Peixin Xu, Hubei (CN); Ziyang Liu, Hubei (CN); Wei Zeng, Hubei (CN); Yang Zhao, Hubei (CN); Lijing Wang, Hubei (CN); Fusong Wang, Hubei (CN); Junxing Zheng, Hubei (CN); Qisheng Hu, Hubei (CN); Jinbiao Tang, Hubei (CN); Chenhui Peng, Hubei (CN)

(73) Assignees: Huazhong University of Science and Technology (GOVERNMENT), Wuhan (CN); Hubei Changjiang Road and Bridge Co., Ltd., Wuhan (CN); Hubei Communications Construction Testing Co., Ltd., Wuhan (CN)

( * ) Notice: Subject to any disclaimer, the term of this patent is extended or adjusted under 35 U.S.C. 154(b) by 0 days.

(21) Appl. No.: 19/031,782

(22) Filed: Jan. 18, 2025

(65) Prior Publication Data
US 2025/0283867 A1    Sep. 11, 2025

(30) Foreign Application Priority Data
Mar. 11, 2024  (CN) .......................... 202410273212.0

(51) Int. Cl.
*G01N 33/42* (2006.01)
*G01N 21/35* (2014.01)
(Continued)

(52) U.S. Cl.
CPC ......... *G01N 33/42* (2013.01); *G01N 21/3563* (2013.01); *G01N 21/552* (2013.01); *G01N 2021/3595* (2013.01)

(58) Field of Classification Search
CPC .. G01N 33/42; G01N 21/3563; G01N 21/552; G01N 2221/3595
(Continued)

(56) References Cited

U.S. PATENT DOCUMENTS

| | | | |
|---|---|---|---|
| 2010/0221338 A1* | 9/2010 | Hsia .................. | A61K 31/4985 436/98 |
| 2011/0091984 A1* | 4/2011 | Williams .............. | G01N 30/88 436/161 |

(Continued)

FOREIGN PATENT DOCUMENTS

| | | | |
|---|---|---|---|
| CN | 103399114 A | | 11/2013 |
| CN | 104231640 A | * | 12/2014 |

(Continued)

OTHER PUBLICATIONS

English translation of CN118069976, May 24, 2024. (Year: 2024).*

*Primary Examiner* — Michael P Nghiem
(74) *Attorney, Agent, or Firm* — Hawaii Patent Services; Nathaniel K. Fedde; Kenton N. Fedde

(57) ABSTRACT

The present invention precisely concerns the calculation method for the optimum two-component synchronous rejuvenator dosage for aged SBS-modified asphalt, including the following steps: (1) calculating the characteristic peak area ratio of unaged SBS molecular chain $I_{B0}$ and unaged pure asphalt IB, aI0 and ARI0; (2) selecting four types of SBS- (Continued)

modified asphalt with different aging degrees and calculating their IBA, IB, aIA and ARIA; (3) adding the rejuvenator to above asphalts and calculating their post-rejuvenation BR, IB, aIR and ARIR; (4) establishing the regression equation between optimum rejuvenator dosage and characteristic peak area ratio requiring restoration due to aging; (5) as the given aged SBS-modified asphalt, substituting the characteristic peak area ratio requiring restoration into the equation to calculate the required optimum rejuvenator dosage. The invention can quickly and accurately determine the optimum SBS molecular chain rejuvenator dosage and pure asphalt component regulator in the aged SBS-modified asphalt.

1 Claim, 3 Drawing Sheets

(51) Int. Cl.
*G01N 21/3563* (2014.01)
*G01N 21/552* (2014.01)

(58) Field of Classification Search
USPC .......................................................... 702/28
See application file for complete search history.

(56) References Cited

U.S. PATENT DOCUMENTS

| | | | |
|---|---|---|---|
| 2013/0332848 A1* | 12/2013 | Lam | H04L 12/1818 715/751 |
| 2017/0370899 A1* | 12/2017 | Porot | G01N 33/42 |
| 2018/0057686 A1* | 3/2018 | Williams | E01C 7/18 |
| 2018/0088007 A1* | 3/2018 | Oho | G01M 99/008 |
| 2025/0137925 A1* | 5/2025 | Zhang | G01N 21/3577 |

FOREIGN PATENT DOCUMENTS

| | | | | |
|---|---|---|---|---|
| CN | 110186866 A | | 8/2019 | |
| CN | 111665214 A | | 9/2020 | |
| CN | 113583457 A | * | 11/2021 | ............ C08L 95/00 |
| CN | 113817329 A | * | 12/2021 | ............ C08L 95/00 |
| CN | 114874635 A | * | 8/2022 | ............ C08L 95/00 |
| CN | 118069976 | * | 5/2024 | |

* cited by examiner

METHOD FOR CALCULATING THE OPTIMUM DOSAGE OF THE TWO-COMPONENT SYNCHRONOUS REJUVENATOR FOR AGED SBS-MODIFIED ASPHALT

CROSS-REFERENCE TO RELATED APPLICATION

This application claims priority of Chinese Patent Application No. 202410273212.0, filed on Mar. 11, 2024, the entire contents of which are incorporated herein by reference.

TECHNICAL FIELD

The present invention relates to the technical field of pavement engineering, which is precisely a method for calculating the optimum dosage of the two-component synchronous rejuvenator for aged SBS-modified asphalt.

BACKGROUND

For the reason that the unique three-dimensional cross-linking network molecular structure of styrene-butadiene-styrene (SBS) block polymer molecular chain can significantly improve the high-temperature performance, low-temperature performance, fatigue resistance, and temperature sensitivity of pure asphalt, SBS-modified asphalt has been popularized and applied worldwide since it was launched. This high-performance modified asphalt has also been widely used in the surface and middle layers of high-grade asphalt pavement and urban trunk pavements in China. However, when subjected to the environmental conditions, the SBS-modified asphalt pavements will inevitably age and deteriorate. Unlike ordinary pavement petroleum pure asphalt, the aging of the SBS-modified asphalt includes not only the aging and hardening of pure asphalt but also the degradation and fracture of molecular chains of the SBS modifier polymers. Specifically, on the one hand, with the increasing service life, aromatic, a light component with poor chemical properties and thermal stability in pure asphalt, is more likely to undergo oxidative condensation reaction and conversion into colloid in thermal and oxidative aging. Furthermore, the unstable colloid will be transformed into a heavy component asphaltene, destroying the original stable colloidal structure of the pure asphalt and resulting in the severe imbalance of the proportions of asphalt components, which is macroscopically manifested as an increase in asphalt viscosity and softening point, and a decrease in penetration and ductility. On the other hand, the C—C group on the polybutadiene block that constitutes the three-dimensional network molecular structure of the SBS has relatively high bonding activity and is easily oxidized by thermal fracture to form oxidizing groups such as hydroxyl and carboxyl groups, resulting in the fracture of SBS molecular chain into two blocks and losing its three-dimensional activity during aging. Therefore, the current research generally believes that the rejuvenation of the SBS-modified asphalt should not only include the aging and rejuvenation of the pure asphalt, but more importantly, the effective rejuvenation of the three-dimensional network molecular structure of the SBS. Correspondingly, the development of the synchronous rejuvenator for the SBS-modified asphalt should include both pure asphalt component regulator and SBS molecular chain rejuvenator.

Patent CN 104231640A disclosed a synchronous rejuvenator for aged SBS-modified asphalt, which includes an asphalt component regulator composed of heavy oil, catalytic cracking oil slurry, and an SBS molecular chain rejuvenator composed of 1,4 butanediol diglycidyl ether. After adding the synchronous rejuvenator of an appropriate amount, the performance of the aged SBS-modified asphalt can be well restored; CN 113583457A disclosed a synchronous rejuvenator whose asphalt component regulator is aromatic oil, and the SBS molecular chain rejuvenator is mainly composed of diisocyanate and diepoxy substances. When the SBS molecular chain rejuvenator is added at 1 to 2% of the mass ratio of the aged SBS-modified asphalt, the broken SBS molecular chain can be effectively rejuvenated; CN 113817329A disclosed a composite rejuvenator for aged SBS-modified asphalt composed of epoxidized soybean oil and epoxidized polybutadiene resin. When 2 to 3% epoxidized polybutadiene resin and 6-10% epoxidized soybean oil are added, the original performance of the aged SBS-modified asphalt can be restored in a two-way manner; CN 114874635A disclosed an SBS molecular chain rejuvenator with any one or several combinations of trithiocyanuric acid, genipin, triallyl isocyanurate, 1-ethyl-(3-dimethylaminopropyl)-carbodiimide, and an aged pure asphalt component regulator with any one or several combinations of cashew nutshell oil, waste engine oil, waste vegetable oil and epoxidized soybean oil. Experiments showed that the synchronous rejuvenator can greatly restore the original performance of aged asphalt. The rejuvenating mechanism of the above synchronous rejuvenators the original performance of the aged SBS-modified asphalt can be summarized as follows: the unstable colloidal structure of the aged pure asphalt is rebalanced by small molecules pure asphalt component regulators, such as catalytic cracking oil slurry, aromatic oil, epoxidized soybean oil, waste oil, and other substances; the hydroxyl and carboxyl groups at the end of the aged and broken SBS molecular chain react with 1,4-butanediol diglycidyl ether, diisocyanate and diepoxy substances, epoxidized polybutadiene resin, trithiocyanuric acid, genipin, and triallyl isocyanurate under certain conditions so as to reconnect the broken SBS molecular chains.

However, all the above studies determine the designed dosage as the optimum dosage of a synchronous rejuvenator by macroscopic performance recovery via an empirical judgment or physical, rheological performance test before and after rejuvenation of the aged SBS-modified asphalt with different proportions of synchronous rejuvenators, which not only is time-consuming and laborious, with the optimum dosage determined largely affected by the designed test scheme but also cannot quickly and accurately determine the optimum dosage of pure asphalt component regulator and SBS molecular chain rejuvenator in the synchronous rejuvenator based on the aging degree of a certain aged SBS-modified asphalt.

SUMMARY (I) To address the shortcomings of the existing technology, the present invention provides a method for calculating the optimum dosage of the two-component synchronous rejuvenator for aged SBS-modified asphalt. The method, as the recovery of infrared spectral characteristic absorption peak area ratio before and after rejuvenation of SBS-modified asphalt with different aging degrees, establishes regression equations between the characteristic peak area ratio that needs to be restored and the pure asphalt component regulator and the SBS molecular chain rejuvenator, to quickly calculate the theoretical optimum dosage of the SBS molecular chain rejuvenator and the pure asphalt component regulator.

(II) To achieve the above purpose, the present invention is realized by the following technical scheme: a method for calculating the optimum dosage of the two-component synchronous rejuvenator for aged SBS-modified asphalt, comprises the following steps, (1) Select the unaged SBS-modified asphalt, detect the vibration intensity of its infrared spectral characteristic functional group polybutadiene at 968 cm$^{-1}$ by the Fourier Transform Infrared Attenuated Total Reflection (FTIR-ATR) module test, calculate the peak area ratio $A_{968}/\Sigma A_{650-2000}$, and record as the characteristic peak area ratio of the unaged SBS molecular chain $I_{B0}$. Meanwhile, detect the vibration intensity of the unaged SBS-modified asphalt at 1376 cm$^{-1}$ and 1600 cm$^{-1}$, calculate the peak area ratio of aliphatic and aromatic group respectively, and record as the characteristic peak area ratio of the unaged SBS-modified asphalt $I_B$, $_aI_0=A_{1376}/\Sigma A_{650-2000}$ and $ARI_0=A_{1600}/\Sigma A_{650-2000}$;

(2) Select several groups of SBS-modified asphalt with different aging degrees, follow the test method in step (1), detect the vibration intensity of the infrared spectral characteristic functional group polybutadiene of the SBS-modified asphalt with different aging degrees at 968 cm$^{-1}$, calculate the peak area ratio $A_{968}/\Sigma A_{650-2000}$, and record as the characteristic peak area ratio of the aged SBS molecular chain IBA; meanwhile detect the vibration intensity of the SBS-modified asphalt with different aging degrees at 1376 cm$^{-1}$ and 1600 cm$^{-1}$, calculate the peak area ratio of aliphatic and aromatic group of the aged SBS-modified asphalt respectively, and record as the characteristic peak area ratio of the aged pure asphalt $I_B$, $_aI_A=A_{1376}/\Sigma A_{650-2000}$ and $ARI_A=A_{1600}/\Sigma A_{650-2000}$;

In a group of aged SBS-modified asphalt, the characteristic peak area ratio of the aged SBS-modified asphalt is $I_{BA}=A_{968}/\Sigma A_{650-2000}$, and the characteristic peak area ratio of aged pure asphalt is $I_B$, $_aI_A=A_{1376}/\Sigma A_{650-2000}$ and $ARI_A=A_{1600}/\Sigma A_{650-2000}$;

(3) On the basis of the characteristic peak area ratio of the unaged SBS molecular chain $I_{B0}$ as well as the characteristic peak area ratio $I_B$, $_aI_0$, and $ARI_0$ of the unaged SBS-modified asphalt in step (1) determine the peak area ratio of polybutadiene that needs to be restored in the multiple groups of SBS-modified asphalt with different aging degrees at 968 cm$^{-1}$ and the peak area ratio of aliphatic and aromatic group at 1376 cm$^{-1}$ and 1600 cm$^{-1}$ in step (2); Wherein the SBS molecular chain rejuvenator, instead of restoring the lost peak area ratio at 968 cm$^{-1}$ by aging, generates the new characteristic absorption peak area ratio through reaction with the oxygen-containing functional group at the end of the broken SBS molecular chain so as to compensate for the above-mentioned lost peak area ratio, while the pure asphalt component regulator can restore the lost peak area ratio at 1376 cm$^{-1}$ and 1600 cm$^{-1}$ due to aging by introducing light component;

(4) Based on the mass percentage of the aged SBS-modified asphalt, add 1% to 10% SBS molecular chain rejuvenator and 1% to 15% pure asphalt component regulator to the SBS-modified asphalt with different aging degrees to obtain multiple groups of rejuvenated SBS-modified asphalt;

(5) Select different pure asphalt component regulator and SBS molecular chain reguvenator to rejuvenate SBS-modified asphalt, follow the test method in step (1), as the chemical reaction type of the SBS molecular chain rejuvenator and the oxygen-containing functional groups at the end of the broken SBS molecular chain, detect the vibration intensity of the infrared spectral reaction rejuvenation characteristic functional groups of the SBS-modified asphalt with different degrees of rejuvenation, calculate the peak area ratio, and record as the peak characteristic area ratio of the rejuvenated SBS molecular chain $I_BR$; meanwhile detect the vibration intensity of the SBS-modified asphalt with different degrees of rejuvenation at 1376 cm$^{-1}$ and 1600 cm$^{-1}$, calculate the peak area ratio of aliphatic and aromatic group of the rejuvenated SBS modified asphalt respectively, and record as the characteristic peak area ratio of the rejuvenated pure asphalt $I_B$, $_aI_R$ and $ARI_R$; then determine the optimum dosage of the SBS molecular chain rejuvenator and the pure asphalt component regulator, namely, the dosage of the SBS molecular chain rejuvenator is the dosage at which the new characteristic absorption peak area ratio generated by the reaction can precisely compensate for the lost characteristic peak area ratio at 968 cm$^{-1}$ by aging, and the optimum dosage of the pure asphalt component regulator is the dosage at which the lost characteristic peak area ratio at 1376 cm$^{-1}$ and 1600 cm$^{-1}$ by aging can be fully restored;

(6) As the optimum dosage of the SBS molecular chain rejuvenator and the pure asphalt component regulator and the characteristic peak area ratio needs to be restored, draw the scatter plot to obtain the regression equation between the optimum dosage of the SBS molecular chain rejuvenator and the restored characteristic peak area ratio $y_1=k_1x+b_1$, and the regression equation between the optimum dosage of the pure asphalt component regulator and the restored characteristic peak area ratio $y_2=k_2x+b_2$;

(7) According to the actual tested $I_{BA}$, $I_B$, $_aI_A$, and $ARI_A$ Of the SBS-modified asphalt with a specific aging degree, take the corresponding $I_{B0}$, $I_B$, $_aI_0$, and $ARI_0$ of the unaged SBS-modified asphalt as reference to calculate the corresponding characteristic peak area ratios need to be restored, and substitute them into the regression equations in step (6) to calculate the optimum dosage of the SBS molecular chain rejuvenator and the pure asphalt component regulator.

Preferably, in step (1), $A_{968}$, $A_{1376}$, and $A_{1600}$ are the peak area corresponding to the infrared spectral wave numbers of 968 cm$^{-1}$, 1376 cm$^{-1}$ and 1600 cm$^{-1}$, respectively, and $\Sigma A_{650-2000}$ is the sum of the peak area of the infrared spectral wave numbers from 650 cm$^{-1}$ to 2000 cm$^{-1}$.

Preferably, in steps (1) to (7), the infrared spectral wave number scanning range of the SBS-modified asphalt in the FTIR-ATR test is from 400 cm$^{-1}$ to 4000 cm$^{-1}$ with 32 scan times.

Preferably, in steps (1) to (7), the SBS molecular chain rejuvenator includes but is not limited to triallyl isocyanurate and diphenylmethane diisocyanate, and the pure asphalt component regulator comprises but is not limited to aromatic oil and cashew nut shell oil.

Preferably, in step (4), the steps for adding the SBS molecular chain rejuvenator and the pure asphalt component regulator into the aged SBS-modified asphalt are as follows:

S1. Heat the aged SBS-modified asphalt to 140 to 160° C., control the speed of the High-speed shears to 800 to 1000 rpm, and uniformly add the corresponding proportion of the pure asphalt component regulator into the aged SBS-modified asphalt. Once the pure asphalt component regulator is completely added, adjust the speed to 1600 to 1800 rpm and continue to shear and mix for 5 to 10 minutes;

S2. Adjust the speed to 500 rpm and uniformly add the corresponding proportion of the SBS molecular chain rejuvenator. Once the SBS molecular chain rejuvenator is completely added, adjust the speed to 800 to 1000 rpm and continue to shear and mix for 10 to 15 minutes, and then place it in an oven at 50 to 70° C. for 60 minutes to obtain the rejuvenated SBS modified asphalt.

Preferably, the formula for calculating the comprehensive rejuvenation rate of the aged SBS-modified asphalt is as follows:

$$\eta_{SBS\ repair\ efficiency} = \frac{I_{group\ after\ reaction\ and\ rejuvenation}}{I_{unaged\ carbon-carbon\ double\ bond}} = \frac{A_{group\ after\ reaction\ and\ rejuvenation}/\sum A_{after\ reaction\ and\ rejuvenation\ 650-2000}}{A_{unaged\ 968}/\sum A_{unaged\ 650-2000}} \quad (1)$$

$$\eta_{matrix\ asphalt\ rejuvenation\ efficiency} = \frac{I_{light\ components\ after\ rejuvenation}}{I_{light\ components\ of\ unaged\ asphalt}} = \frac{(A_{rejuvenated\ 1376} + A_{rejuvenated\ 1600})/\sum A_{after\ reaction\ and\ rejuvenation\ 650-2000}}{(A_{unaged\ 1376} + A_{unaged\ 1600})/\sum A_{unaged\ 650-2000}} \quad (2)$$

$$\eta_{comprehensive\ repair\ rate} = \frac{\eta_{SBS\ repair\ efficiency} + \eta_{matrix\ asphalt\ rejuvenation\ efficiency}}{2}. \quad (3)$$

(III) The present invention provides a method for calculating the optimum dosage of two-component synchronous rejuvenator for aged SBS-modified asphalt, with the following beneficial effects:

1. The present invention provides a method for calculating the optimum dosage of two-component synchronous rejuvenator for aged SBS-modified asphalt. The method, as the restored infrared spectral characteristic absorption peak area ratio before and after rejuvenation of SBS-modified asphalt with different aging degrees, establishes regression equations between the characteristic peak area ratio needs to be restored and the pure asphalt component regulator and the SBS molecular chain rejuvenator. When rejuvenating SBS-modified asphalt with some aging degree, merely need to determine the characteristic peak area ratio of the lost SBS molecular chain and that of the lost pure asphalt caused by aging and substitute them into the determined regression equations, respectively. The theoretical optimum dosage of the SBS molecular chain rejuvenator and pure asphalt component regulator can be obtained quickly.

2. The present invention proposes a comprehensive rejuvenation efficiency calculation method for aged SBS-modified asphalt according to the restored infrared spectral characteristic absorption peak area ratio before and after the rejuvenation of SBS-modified asphalt with different aging degrees. It further adjusts and improves the theoretical optimum dosage of the SBS molecular chain rejuvenator and pure asphalt component regulator to the optimal level by comparing the actual rejuvenation efficiency.

DETAILED DESCRIPTION OF THE EMBODIMENTS

The technical scheme in the embodiments of the present invention is clearly and completely described below, and it is evident that the described embodiments are only some embodiments of the present invention, not all embodiments.

Figure 1:
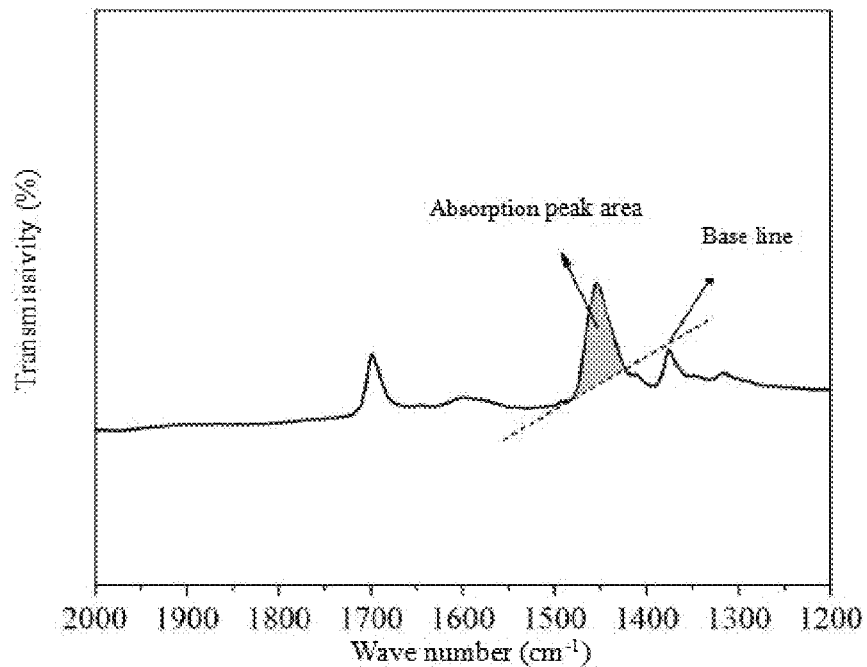
FIG. 1 is a schematic diagram of the calculation of the asphalt Fourier infrared spectral absorption peak area of the present invention.

Firstly, samples were taken from an SBS-modified asphalt storage tank of an asphalt manufacturer in Hubei Province and immediately taken after the SBS-modified asphalt had been prepared and recorded as unaged SBS-modified asphalt. The SBS molecular chain characteristic peak area ratio and the pure asphalt characteristic peak area ratio of the asphalt sample were used as a basis. Then, as the SBS-modified asphalt described above, artificial long-term aged asphalt was prepared. According to the Chinese Code of *Standard Test Methods of Bitumen and Bituminous Mixtures for Highway Engineering* (JTGE20-2011), the long-term aged SBS-modified asphalt with 20 h and 40 h pressure aging were made and recorded as RTFO+20 h PAV aged asphalt and RTFO+40 h PAV aged asphalt respectively. Finally, on the surface of a highway in Hubei Province, the SBS-modified asphalt samples of the middle and surface layers with a service life of about 12 years were obtained. In sampling the SBS-modified asphalt in service, the surface asphalt of the surface layer was scraped with a scraper, and the middle layer was drilled with a small electric drill to the middle layer, and then the base course asphalt scattered in the drilling process was taken. The infrared spectral characteristic absorption peaks of the SBS molecular chain and the pure asphalt were tested by the FTIR-ATR test module for the above four samples of SBS-modified asphalt with different aging degrees and the unaged SBS-modified asphalt. The calculation principle of the characteristic peak area is shown in FIG. 1.

Embodiment 1

A method for calculating the optimum dosage of the two-component synchronous rejuvenator for aged SBS-modified asphalt includes:

Step (1): Select the unaged SBS-modified asphalt, detect the vibration intensity of its infrared spectral characteristic functional group polybutadiene at 968 cm$^{-1}$, calculate the peak area ratio $A_{968}/\Sigma A_{650-2000}$, and record the characteristic peak area ratio of the unaged SBS molecular chain $I_{B0}$, meanwhile detect the vibration intensity of the unaged SBS-modified asphalt at 1376 cm-1 and 1600 cm$^{-1}$, calculate the peak area ratio of the aliphatic and aromatic group respectively, and record the characteristic peak area ratio of the unaged SBS-modified asphalt $I_B$, $_aI_0=A_{1376}/\Sigma A_{650-20000}$ and $ARI_0=A_{1600}/\Sigma A_{650-2000}$. The calculation results are shown in Table 1 below.

TABLE 1

Calculation results of characteristic peak area ratio of unaged SBS-modified asphalt

| Type | $I_{B0}$ | $I_B$, $_aI_0$ | $ARI_0$ |
|---|---|---|---|
| Unaged SBS-modified asphalt | 0.182 | 0.170 | 0.190 |

Step (2): Select the above four types of SBS-modified asphalt with different aging degrees, detect and calculate the peak area ratios according to the method in step (1), which records the characteristic peak area ratio of the aged SBS molecular chain $I_{BA}$, the characteristic peak area ratio of the aged SBS-modified asphalt $I_B$, $_aI_A$ and $ARI_A$ respectively. The calculation results are shown in Table 2 below.

TABLE 2

Calculation results of characteristic peak area ratio of SBS-modified asphalt with different aging degrees

| Type | $I_{BA}$ | $I_B$, $_aI_A$ | $ARI_A$ |
|---|---|---|---|
| RTFO + 20 h PAV aged asphalt | 0.112 | 0.142 | 0.118 |
| RTFO + 40 h PAV aged asphalt | 0.062 | 0.130 | 0.120 |
| Aged SBS-modified asphalt of the surface layer | 0.022 | 0.100 | 0.110 |
| Aged SBS-modified asphalt of the middle layer | 0.050 | 0.150 | 0.090 |

Step (3): Determine the lost peak area ratios caused by aging that need to be restored on the basis of the characteristic peak area ratio of the unaged SBS molecular chain $I_{B0}$ as well as the characteristic peak area ratio $I_B$, $aI_0$ and $ARI_0$ of the unaged SBS-modified asphalt in step (1), determine the peak area ratio of polybutadiene that needs to be restored in the multiple groups of SBS-modified asphalt with different aging degrees at 968 cm$^{-1}$ and the peak area ratio of aliphatic and aromatic group at 1376 cm$^{-1}$ and 1600 cm$^{-1}$ in step (2). Wherein the SBS molecular chain rejuvenator, rather than restoring the lost peak area ratio at 968 cm$^{-1}$ by aging, generates the new characteristic absorption peak area ratio of O generated through reaction with the oxygen-containing functional group at the end of the broken SBS molecular chain to compensate for the above-mentioned lost peak area ratio; while the pure asphalt component regulator can restore the lost peak area ratio at 1376 cm$^{-1}$ and 1600 cm$^{-1}$ due to aging by introducing light components. The calculation results are shown in Table 3 below.

TABLE 3

Characteristic peak area ratio to be restored

| Type | $I_{B0}$-$I_{BA}$ | ($I_B$, $_aI_0$ + $ARI_0$)-($I_B$, $_aI_A$ + $ARI_A$) |
|---|---|---|
| RTFO + 20 h PAV aged asphalt | 0.070 | 0.100 |
| RTFO + 40 h PAV aged asphalt | 0.120 | 0.110 |
| Aged SBS-modified asphalt of the surface layer | 0.160 | 0.150 |
| Aged SBS-modified asphalt of the middle layer | 0.132 | 0.120 |

In step (4): As the mass percentage of the aged SBS-modified asphalt, add 1% to 10% SBS molecular chain rejuvenator (triallyl isocyanurate) and 1% to 15% pure asphalt component regulator (aromatic oil) to the SBS-modified asphalt with different aging degrees to obtain multiple groups of rejuvenated SBS modified asphalt. The specific addition method is as follows, S1. Heat the aged SBS-modified asphalt to 150° C., control the speed of the High-speed shears to 900 rpm, and uniformly add the corresponding proportion of the aromatic oil into the aged SBS-modified asphalt. Once the aromatic oil is completely added, adjust the speed to 1700 rpm and continue to shear and mix for 5 minutes;

S2. Adjust the speed to 500 rpm and uniformly add the corresponding proportion of the triallyl isocyanurate. Once the triallyl isocyanurate is completely added, adjust the speed to 900 rpm and continue to shear and mix for 15 minutes. Then, place it in an oven at 60° C. for 60 minutes to obtain the rejuvenated SBS-modified asphalt.

In step (5): Select multiple groups of rejuvenated SBS-modified asphalt, detect and calculate the peak area ratio at 1,022 cm$^{-1}$/1,122 cm$^{-1}$, 1376 cm$^{-1}$, and 1600 cm$^{-1}$ according to the method in step (1), and record the characteristic peak area ratio of the rejuvenated SBS molecular chain $I_{BR}$, the characteristic peak area ratio of the rejuvenated SBS modified asphalt $I_B$, $aI_R$ and $ARI_R$ so as to determine the optimum dosage of the aromatic oil and the triallyl isocyanurate, namely, the optimum dosage of the triallyl isocyanurate is the dosage at which the new characteristic absorption peak area ratio generated through the reaction at 1,022 cm$^{-1}$/1,122 cm$^{-1}$ can precisely compensate for the lost characteristic peak area ratio at 968 cm$^{-1}$ by aging and the optimum dosage of the aromatic oil is the dosage at which the lost characteristic peak area ratio at 1376 cm$^{-1}$ and 1600 cm$^{-1}$ by aging can be fully restored. The specific results are shown in Table 4 below.

TABLE 4

The Corresponding relationship between the characteristic peak area ratio needs to be restored, and the optimum dosage of triallyl isocyanurate and aromatic oil

| | Triallyl isocyanurate | | Aromatic oil | |
|---|---|---|---|---|
| Type | Characteristic peak area ratio to be restored | Optimum dosage | Characteristic peak area ratio to be restored | Optimum dosage |
| RTFO + 20 h PAV aged asphalt | 0.070 | 3% | 0.100 | 5% |
| RTFO + 40 h PAV aged asphalt | 0.120 | 5% | 0.110 | 5% |
| Aged SBS-modified asphalt of the surface layer | 0.160 | 7% | 0.150 | 7% |
| Aged SBS-modified asphalt of the middle layer | 0.132 | 6% | 0.120 | 6% |

Figure 2:
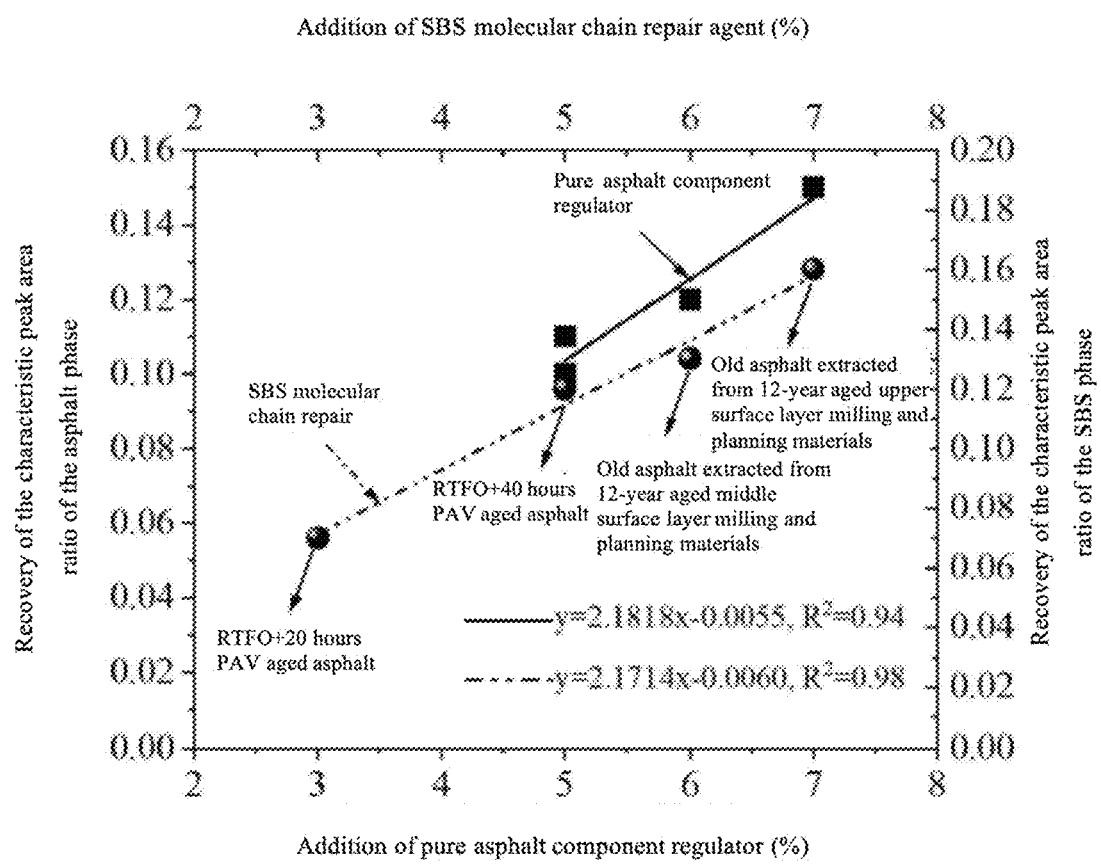
FIG. 2 is a corresponding diagram between the optimum dosage of the SBS molecular chain rejuvenator and pure asphalt component regulator, and the characteristic peak area ratio needs to be restored.

In step (6), As the optimum dosage of the triallyl isocyanurate and the aromatic oil and the characteristic peak area ratio needs to be recovered, draw the scatter plot, as shown in FIG. 2. Obtain the regression equation between the optimum dosage of the triallyl isocyanurate and the characteristic peak area ratio restored (the peak area ratio generated at 1,022 cm$^{-1}$/1,122 cm$^{-1}$ compensates for the lost peak area ratio at 968 cm$^{-1}$) $y_1=2.1714x-0.0060(R^2=0.94)$, and the regression equation between the optimum dosage of the aromatic oil and the characteristic peak area ratio restored at 1376 cm$^{-1}$/1600 cm$^{-1}$ $y_2=2.1818x-0.0055(R^2=0.99)$; Wherein the new characteristic absorption peak area ratio at 1,022 cm$^{-1}$/1,122 cm$^{-1}$ refers to $A_{1022}/\Sigma A_{650\text{-}2000}+A_{1122}/\Sigma A_{650\text{-}2000}$; and the characteristic peak area ratio at 1376 cm$^{-1}$/1600 cm$^{-1}$ refers to $A_{1376}/\Sigma A_{650\text{-}2000}+A_{1600}/\Sigma A_{650\text{-}2000}$.

The above $A_{968}$, $A_{1022}$, $A_{1122}$, $A_{1376}$, and $A_{1600}$ refer to the corresponding peak area at the infrared spectral wave numbers of 968 cm$^{-1}$, 1,022 cm$^{-1}$, 1,122 cm$^{-1}$, 1376 cm$^{-1}$ and 1600 cm$^{-1}$, respectively. $\Sigma A_{650\text{-}2000}$ refers to the sum of the peak area of the infrared spectral wave numbers from 650 to 2000 cm$^{-1}$. The infrared spectral wave number scanning range of the SBS-modified asphalt during the FTIR-ATR test is from 400 to 4000 cm$^{-1}$ with 32 scans.

The present invention further proposes the actual rejuvenation efficiency of aged SBS-modified asphalt according to steps (1)-(7) and evaluates the actual rejuvenation efficiency under the theoretical optimum dosage of the triallyl isocyanurate and aromatic oil. The formula for calculating the comprehensive repair rate of the aged SBS-modified asphalt is as follows:

$$\eta_{SBS\ repair\ efficiency} = \frac{I_{group\ after\ reaction\ and\ rejuvenation}}{I_{unaged\ carbon-carbon\ double\ bond}} = \frac{A_{group\ after\ reaction\ and\ rejuvenation}/\sum A_{after\ reaction\ and\ rejuvenation\ 650-2000}}{A_{unaged\ 968}/\sum A_{unaged\ 650-2000}} \quad (1)$$

$$\eta_{matrix\ asphalt\ rejuvenation\ efficiency} = \frac{I_{light\ components\ after\ rejuvenation}}{I_{light\ components\ of\ unaged\ asphalt}} = \frac{(A_{rejuvenated\ 1376} + A_{rejuvenated\ 1600})/\sum A_{after\ reaction\ and\ rejuvenation\ 650-2000}}{(A_{unaged\ 1376} + A_{unaged\ 1600})/\sum A_{unaged\ 650-2000}} \quad (2)$$

$$\eta_{comprehensive\ repair\ rate} = \frac{\eta_{SBS\ repair\ efficiency} + \eta_{matrix\ asphalt\ rejuvenation\ efficiency}}{2} \quad (3)$$

Figure 3:
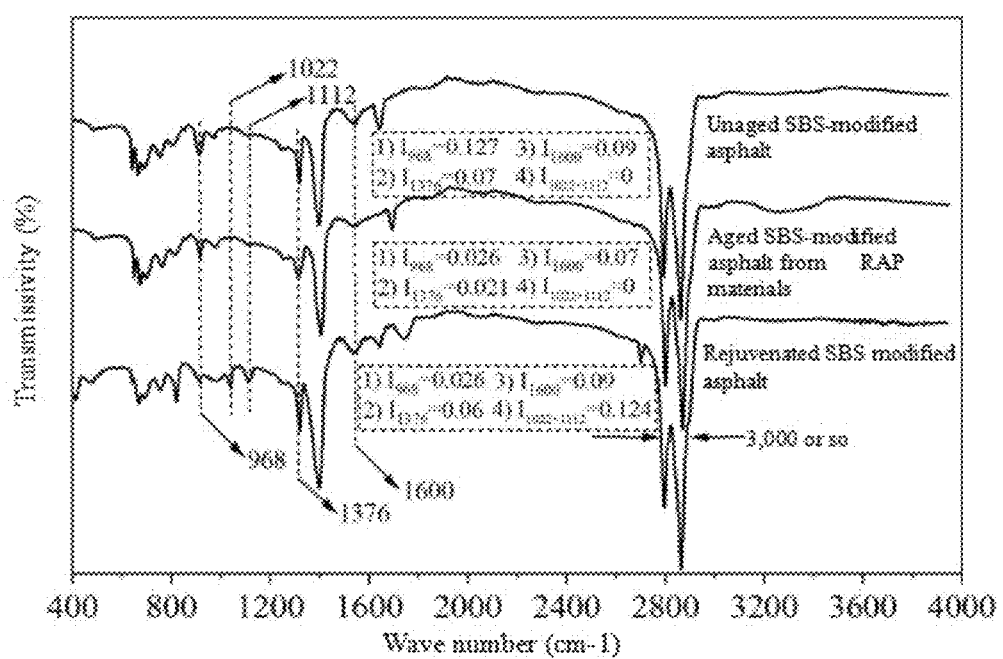
FIG. 3 shows the change in infrared spectral characteristic peak area ratio before and after the rejuvenation of the aged SBS-modified asphalt of the present invention.

In step (7): Select the aged SBS-modified asphalt from the RAP materials in the surface layer of a highway in Hubei Province to determine the $I_{BA}$, $I_B$, $aI_A$, and $ARI_A$ through FTIR-ATR test, select an unaged SBS-modified asphalt to determine the $I_{BO}$, $I_B$, $aI_0$, and $ARI_0$ through FTIR-ATR test as reference. In this way, the corresponding characteristic peak area ratio needs to be restored and recovered, wherein the peak area ratio of the SBS phase needs to be restored is 0.10, and the peak area ratio of the pure asphalt phase needs to be restored is 0.13. Substitute them into the regression equations in step (6) to calculate the theoretical optimum dosage of triallyl isocyanurate and aromatic oil. The calculation shows that the optimum dosage of the aromatic oil is 6.81%, and that of the triallyl isocyanurate is 4.36%. The change of infrared spectral characteristic peak area ratio before and after the rejuvenation of the aged SBS-modified asphalt is shown in FIG. 3.

According to equations (1)-(3), the comprehensive rejuvenation efficiency of the highway RAP materials is as high as 96.39% under the theoretical optimum dosage of the triallyl isocyanurate and the aromatic oil. The two-way rejuvenation effect is good.

Embodiment 2

Steps (1)-(3) of the present embodiment are the same as that in Embodiment 1.

In step (4): As the mass percentage of the aged SBS-modified asphalt, add 1% to 10% SBS molecular chain rejuvenator (diphenylmethane diisocyanate) and 1% to 15% pure asphalt component regulator (cashew nutshell oil) to the SBS-modified asphalt with different aging degrees to obtain multiple groups of rejuvenated SBS modified asphalt. The specific addition method is as follows:

S1. Heat the aged SBS-modified asphalt to 150° C., control the speed of the High-speed shears to 900 rpm, and uniformly add the corresponding proportion of the cashew nutshell oil into the aged SBS-modified asphalt. Once the cashew nutshell oil is completely added, adjust the speed to 1700 rpm and continue to shear and mix for 5 minutes;

S2. Adjust the speed to 500 rpm and uniformly add the corresponding proportion of the diphenylmethane diisocyanate. Once the diphenylmethane diisocyanate is completely added, adjust the speed to 900 rpm and continue to shear and mix for 15 minutes, and then place it in an oven at 60° C. for 60 minutes to obtain the rejuvenated SBS-modified asphalt.

In step (5): Select multiple groups of rejuvenated SBS-modified asphalt, detect and calculate the peak area ratio at 1,230 cm$^{-1}$/1,730 cm$^{-1}$, 1376 cm$^{-1}$, and 1600 cm$^{-1}$ according to the method in step (1), and record the characteristic peak area ratio of the rejuvenated SBS molecular chain $I_{BR}$, the characteristic peak area ratio of the rejuvenated SBS modified asphalt $I_B$, $aI_R$ and $ARI_R$ respectively, then determine the optimum dosage of the cashew nutshell oil and the diphenylmethane diisocyanate, namely, the optimum dosage of the diphenylmethane diisocyanate is the dosage at which the new characteristic absorption peak area ratio (ether-based characteristic absorption peak area ratio) generated through the reaction at 1,230 cm$^{-1}$/1,730 cm$^{-1}$ can precisely compensate for the lost characteristic peak area ratio at 968 cm$^{-1}$ by aging. And the optimum dosage of cashew nutshell oil is the dosage that can fully recover the lost characteristic peak area ratio at 1376 cm$^{-1}$ and 1600 cm$^{-1}$ by aging. The specific results are shown in Table 4 below.

optimum dosage of the diphenylmethane diisocyanate and the characteristic peak area ratio restored (the peak area ratio generated at 1,230 cm$^{-1}$/1,730 cm$^{-1}$ compensates for the lost peak area ratio at 968 cm$^{-1}$) $y_1=0.0178x+0.005(R^2=0.97)$, and the regression equation between the optimum dosage of the cashew nutshell oil and the characteristic peak area ratio restored at 1376 cm$^{-1}$/1600 cm$^{-1}$ $y_2=0.0126x+0.0226$ ($R^2=0.99$). Wherein the new characteristic absorption peak area ratio at 1,230 cm$^{-1}$/1,730 cm$^{-1}$ refers to $A_{1230}/\Sigma A_{650-2000}+A_{1730}/\Sigma A_{650-2000}$; and the characteristic peak area ratio at 1376 cm$^{-1}$/1600 cm$^{-1}$ refers to $A_{1376}/\Sigma A_{650-2000}+A_{1600}/\Sigma A_{650-2000}$.

In step (7): Select the aged SBS-modified asphalt from the RAP materials in the surface layer of a highway in Hubei Province to determine the $I_{BA}$, $I_B$, $aI_A$, and $ARI_A$ through FTIR-ATR test, select an unaged SBS-modified asphalt to determine the $I_{B0}$, $I_B$, $aI_0$, and $ARI_0$ through FTIR-ATR test as reference. In this way, the corresponding characteristic peak area ratio to be restored, wherein the peak area ratio of the SBS phase needs to be restored, is 0.10, and the peak area ratio of the pure asphalt phase needs to be restored is 0.13. Substitute them into the regression equations in step (6) to calculate the theoretical optimum dosage of diphenylmethane diisocyanate and cashew nutshell oil. Through calculation, it can be seen that the optimum dosage of the cashew nutshell oil is 8.52%, and that of the diphenylmethane diisocyanate is 2.81%.

The above $A_{968}$, $A_{1230}$, $A_{1376}$, $A_{1600}$, and $A_{1730}$ refer to the corresponding peak area at the infrared spectral wave numbers of 968 cm$^{-1}$, 1,230 cm$^{-1}$, 1376 cm$^{-1}$, 1600 cm$^{-1}$ and 1,730 cm$^{-1}$, respectively. And $\Sigma A_{650-2000}$ refers to the sum of the peak area of the infrared spectral wave numbers from 650 to 2000 cm$^{-1}$. The infrared spectral wave number scanning range of the SBS-modified asphalt during the FTIR-ATR test is from 400 to 4000 cm$^{-1}$ with 32 scans.

The present invention further proposes the actual rejuvenation efficiency of aged SBS-modified asphalt according to steps (1)-(7) and evaluates the actual rejuvenation efficiency

TABLE 4

The Corresponding relationship between the characteristic peak area ratio needs to be restored, and the optimum dosage of diphenylmethane diisocyanate and cashew nutshell oil

| Type | Diphenylmethane diisocyanate | | Cashew nutshell oil | |
|---|---|---|---|---|
| | Characteristic peak area ratio to be restored | Optimum dosage | Characteristic peak area ratio to be restored | Optimum dosage |
| RTFO + 20 h PAV aged asphalt | 0.070 | 4% | 0.100 | 6% |
| RTFO + 40 h PAV aged asphalt | 0.120 | 6% | 0.110 | 7% |
| Aged SBS-modified asphalt of the surface layer | 0.160 | 9% | 0.150 | 10% |
| Aged SBS-modified asphalt of the middle layer | 0.132 | 7% | 0.120 | 8% |

In step (6): As the optimum dosage of the diphenylmethane diisocyanate and the cashew nutshell oil and the characteristic peak area ratio needs to be restored, draw the scatter plot to obtain the regression equation between the under the theoretical optimum dosage of the diphenylmethane diisocyanate and the cashew nut shell oil. The formula for calculating the comprehensive repair rate of the aged SBS-modified asphalt is as follows:

$$\eta_{SBS\ repair\ efficiency} = \frac{I_{group\ after\ reaction\ and\ rejuvenation}}{I_{unaged\ carbon-carbon\ double\ bond}} = \quad (1)$$

$$\frac{A_{group\ after\ reaction\ and\ rejuvenation}/\sum A_{after\ reaction\ and\ rejuvenation\ 650-2000}}{A_{unaged\ 968}/\sum A_{unaged\ 650-2000}}$$

$$\eta_{matrix\ asphalt\ rejuvenation\ efficiency} = \frac{I_{light\ components\ after\ rejuvenation}}{I_{light\ components\ of\ unaged\ asphalt}} = \quad (2)$$

$$\frac{(A_{rejuvenated\ 1376} + A_{rejuvenated\ 1600})/\sum A_{after\ reaction\ and\ rejuvenation\ 650-2000}}{(A_{unaged\ 1376} + A_{unaged\ 1600})/\sum A_{unaged\ 650-2000}}$$

$$\eta_{comprehensive\ repair\ rate} = \frac{\eta_{SBS\ repair\ efficiency} + \eta_{matrix\ asphalt\ rejuvenation\ efficiency}}{2}. \quad (3)$$

According to equations (1)-(3), the comprehensive rejuvenation efficiency of the highway RAP materials is as high as 92.51% under the theoretical optimum dosage of the diphenylmethane diisocyanate and the cashew nutshell oil. The two-way rejuvenation effect is good.

The published embodiments of the present invention are preferred but not limited to these. Those who skilled in the field will find it is very easy to comprehend the spirit of the present invention according to the above embodiments and make different extensions and variations, which would be within the protection of the present invention as long as they follow the spirit of the present invention.

The invention claimed is:

1. A method for calculating an optimum dosage of a two-component synchronous rejuvenator for aged styrene-butadiene-styrene (SBS)-modified asphalt comprising:

(1) selecting unaged SBS-modified asphalt, detecting vibration intensity of an infrared spectral characteristic functional group polybutadiene at 968 $cm^{-1}$ of the SBS-modified asphalt, calculating a peak area ratio $A_{968}/\Sigma A_{650-2000}$, and recording a characteristic peak area ratio of unaged SBS molecular chain as $I_{B0}$; meanwhile, detecting a vibration intensity of the unaged SBS-modified asphalt at 1376 $cm^{-1}$ and 1600 $cm^{-1}$, calculating a peak area ratio of an aliphatic and aromatic group, respectively, and recording a characteristic peak area ratio of the unaged SBS-modified asphalt as $I_B$, $_aI_0=A_{1376}/\Sigma A_{650-2000}$, or $ARI_0=A_{1600}/\Sigma A_{650-2000}$;

(2) selecting several groups of SBS-modified asphalt with different aging degrees, following a test method in step (1), detecting a vibration intensity of the infrared spectral characteristic functional group polybutadiene of the SBS-modified asphalt with different aging degrees at 968 $cm^{-1}$, and recording a characteristic peak area ratio of aged SBS molecular chain as $I_{BA}$; meanwhile, detecting a vibration intensity of the SBS-modified asphalt with different aging degrees at 1376 $cm^{-1}$ and 1600 $cm^{-1}$, calculating a peak area ratio of an aliphatic and aromatic group of the aged SBS-modified asphalt, respectively, and recording a characteristic peak area ratio of aged pure asphalt as $I_B$, $_aI_A=A_{1376}/\Sigma A_{650-2000}$, and $ARI_A=A_{1600}/\Sigma A_{650-2000}$;

(3) based on the characteristic peak area ratio of the unaged SBS molecular chain $I_{B0}$ as well as a characteristic peak area ratio of $I_B$, $_aI_0$, and $ARI_0$ of the unaged SBS-modified asphalt in step (1), determining a peak area ratio of polybutadiene in the SBS-modified asphalt with different aging degrees at 968 $cm^{-1}$ and the peak area ratio of aliphatic and aromatic group at 1376 $cm^{-1}$ and 1600 $cm^{-1}$ in step (2); wherein an SBS molecular chain rejuvenator, instead of restoring a lost peak area ratio at 968 $cm^{-1}$ by aging, generates a new characteristic absorption peak area ratio through reaction with an oxygen-containing functional group at an end of a broken SBS molecular chain so to compensate for the lost peak area ratio, while a pure asphalt component regulator restores the lost peak area ratio at 1376 $cm^{-1}$ and 1600 $cm^{-1}$ due to aging by introducing light components;

(4) based on a mass percentage of the aged SBS-modified asphalt, adding 1% to 10% SBS molecular chain rejuvenator and 1% to 15% pure asphalt component regulator to the SBS-modified asphalt with different aging degrees to obtain multiple groups of rejuvenated SBS-modified asphalt;

in step (4), the steps for adding the SBS molecular chain rejuvenator and the pure asphalt component regulator into the aged SBS-modified asphalt are as follows:

(S1) heating the aged SBS-modified asphalt to 140 to 160° C., controlling a speed of high-speed shears to 800 to 1000 rpm, and uniformly adding a corresponding proportion of the pure asphalt component regulator into the aged SBS-modified asphalt; once the pure asphalt component regulator is completely added, adjusting the speed to 1600 to 1800 rpm and continuing to shear and mix for 5 to 10 minutes;

(S2) adjusting the speed to 500 rpm and uniformly adding a corresponding proportion of the SBS molecular chain rejuvenator; once the SBS molecular chain rejuvenator is completely added, adjusting the speed to 800 to 1000 rpm and continuing to shear and mixing for 10 to 15 minutes, and then placing a mixture in an oven at 50 to 70° C. for 60 minutes to obtain the rejuvenated SBS modified asphalt;

(5) selecting different combinations of pure asphalt component regulator and SBS molecular chain rejuvenator to rejuvenate SBS-modified asphalt, following the test method in step (1), as a chemical reaction type of the SBS molecular chain rejuvenator and oxygen-containing functional groups at an end of a broken SBS molecular chain, detecting a vibration intensity of infrared spectral reaction rejuvenation characteristic functional groups of the SBS-modified asphalt with different degrees of rejuvenation, calculating a peak area ratio, and recording a peak characteristic area ratio of rejuvenated SBS molecular chain as $I_{BR}$; meanwhile detecting the vibration intensity of the SBS-modified asphalt with different degrees of rejuvenation at 1376 cm$^{-1}$ and 1600 cm$^{-1}$, calculating a peak area ratio of aliphatic and aromatic group of the rejuvenated SBS modified asphalt respectively, and recording a characteristic peak area ratio of rejuvenated pure asphalt as $I_B$, $_aI_R$ and $ARI_R$; then determining an optimum dosage of the SBS molecular chain rejuvenator and the pure asphalt component regulator, namely, the optimum dosage of the SBS molecular chain rejuvenator is a dosage at which a new characteristic absorption peak area ratio generated by reaction precisely compensates for the lost characteristic peak area ratio at 968 cm$^{-1}$ by aging, and the optimum dosage of the pure asphalt component regulator is a dosage at which the lost characteristic peak area ratio at 1376 cm$^{-1}$ and 1600 cm$^{-1}$ by aging is fully restored;

(6) as the optimum dosage of the SBS molecular chain rejuvenator and the pure asphalt component regulator and the characteristic peak area ratio needs to be restored, drawing a scatter plot to obtain a regression equation between the optimum dosage of the SBS molecular chain rejuvenator and the restored characteristic peak area ratio $y_1 = k_1 x + b_1$, and a regression equation between the optimum dosage of the pure asphalt component regulator and the restored characteristic peak area ratio $y_2 = k_2 x + b_2$;

(7) according to the actual tested $I_{BA}$, $I_B$, $_aI_A$, and $ARI_A$ of the SBS-modified asphalt with a specific aging degree, taking $I_{B0}$, $I_B$, $_aI_0$ and $ARI_0$ of the unaged SBS-modified asphalt as reference to calculate corresponding characteristic peak area ratios that need to be restored, and substituting into the regression equations in step (6) to calculate the optimum dosage of the SBS molecular chain rejuvenator and the pure asphalt component regulator;

in steps (1) to (7), $A_{968}$, $A_{1376}$, and $A_{1600}$ refer to the peak area corresponding to the infrared spectral wave number of 968 cm$^{-1}$, 1376 cm$^{-1}$, and 1600 cm$^{-1}$, respectively; $\Sigma A_{650\text{-}2000}$ is the sum of the peak area of the infrared spectral wave numbers from 650 cm$^{-1}$ to 2000 cm$^{-1}$.

* * * * *